(12) United States Patent
Kulkarni et al.

(10) Patent No.: US 7,480,756 B2
(45) Date of Patent: Jan. 20, 2009

(54) ELECTRONIC DATA PROCESSING CIRCUIT THAT TRANSMITS PACKED WORDS VIA A BUS

(75) Inventors: Milind Manohar Kulkarni, Bangalore (IN); Bijo Thomas, Kottayam (IN)

(73) Assignee: Koninklijke Philips Electronics N.V., Eindhoven (NL)

( * ) Notice: Subject to any disclaimer, the term of this patent is extended or adjusted under 35 U.S.C. 154(b) by 278 days.

(21) Appl. No.: 10/579,383

(22) PCT Filed: Nov. 3, 2004

(86) PCT No.: PCT/IB2004/052281

§ 371 (c)(1),
(2), (4) Date: May 11, 2006

(87) PCT Pub. No.: WO2005/048115

PCT Pub. Date: May 26, 2005

(65) Prior Publication Data

US 2007/0083693 A1  Apr. 12, 2007

(30) Foreign Application Priority Data

Nov. 13, 2003 (EP) .................................. 03104176

(51) Int. Cl.
*G06F 13/38* (2006.01)
(52) U.S. Cl. .......................... 710/307; 710/66
(58) Field of Classification Search .................. 710/307, 710/66
See application file for complete search history.

(56) References Cited

U.S. PATENT DOCUMENTS

| | | | | |
|---|---|---|---|---|
| 4,447,878 A | * | 5/1984 | Kinnie et al. ............... | 710/307 |
| 4,667,305 A | * | 5/1987 | Dill et al. ..................... | 710/307 |
| 4,878,166 A | * | 10/1989 | Johnson et al. ............. | 710/307 |
| 5,388,227 A | * | 2/1995 | McFarland ................... | 710/307 |
| 5,561,772 A | * | 10/1996 | Dornier et al. .............. | 710/300 |
| 5,790,874 A | * | 8/1998 | Takano et al. ............... | 713/320 |
| 5,901,294 A | * | 5/1999 | Tran et al. .................... | 710/107 |
| 6,366,984 B1 | | 4/2002 | Carmean et al. | |
| 6,618,777 B1 | * | 9/2003 | Greenfield ................... | 710/120 |
| 7,085,875 B1 | * | 8/2006 | Yona et al. ................... | 710/307 |
| 7,257,661 B2 | * | 8/2007 | O'Donnell .................... | 710/305 |

FOREIGN PATENT DOCUMENTS

| EP | 0 465 320 | | 1/1992 |
|---|---|---|---|
| GB | 2375695 A | * | 11/2002 |

OTHER PUBLICATIONS

"Reordering Memory Bus Transactions for Reduced PowerConsumption" by Childers et al pp. 1-9 Jun. 2000.*

* cited by examiner

*Primary Examiner*—Paul R Myers
(74) *Attorney, Agent, or Firm*—Michael E. Belk (57) ABSTRACT

An electronic data processing circuit contains a plurality of data handling units (10a-d, 16a-b) with data outputs, at least part of the data handling units having address outputs. The data handling units supply words of preferably selectable size to a bus. A bus controller (20) is arranged to control access to the bus in successive access cycles. The bus controller (20) causes data bits from a plurality of data words from respective ones of the data handling units (10a-d, 16a-b), to be placed in combination on the data lines in a same bus cycle. The bus controller causes write addresses that the respective ones of the data handling units (10a-d, 16a-b) supply for respective ones of the plurality of data words to be placed on the address lines in a plurality of respective bus cycles. Preferably, the temporal or spatial arrangement of the data words on the bus lines adapted so as to minimize the number of logic level changes on the bus.

13 Claims, 6 Drawing Sheets

ELECTRONIC DATA PROCESSING CIRCUIT THAT TRANSMITS PACKED WORDS VIA A BUS

The invention relates to an electronic data processing circuit that comprises a bus and a plurality of data handling units that have access to the bus.

An address/data bus is a well-known solution for allowing multiple data handling units to get access to shared resources, such as memories. Conventionally, one data handling unit at a time gets access to the bus, to place data and a corresponding address on the data lines and address lines of the bus respectively.

Modern data busses are very wide, permitting words with many bits (e.g. 64 or 128 bits) to be placed on the bus in a single bus cycle. Data handling circuits do not always use all these bits, because often the size of a word that has to be written is less than the maximum word size. For example, often numbers of 32 or even 16 bits are used.

U.S. Pat. No. 6,366,984 discloses how this redundancy can be used to increase memo bandwidth by packing different words that have to be written from a cache memory to a main memory at adjacent addresses. The packed words are placed on the data lines of the data bus in parallel in the same bus cycle. The circuit of U.S. Pat. No. 6,366,984 waits before writing back updated data words from the cache memory if the data words span less than the full bus width. The circuit compares the addresses to determine whether the addresses of the data words are adjacent. If so the data words are packed and written in a single bus cycle. Similarly EP 465320 discloses a write packer (see e.g. FIG. 19 element 301) that collects write requests and compares the addresses from the requests to determine whether data from different requests can be packed into a single bus cycle.

Of course this form of packing is limited by the maximum word size (the number of data lines) of the bus. Writing to a range of addresses that spans more than this word size generally involves multiple bus cycles, but in this case the supply of multiple addresses can be avoided by using a start address and a length code, that enables a data receiving device, such as a memory to compute the relevant addresses for the data from different bus cycles internally.

These documents show how one can reduce the number of bus cycles that is needed to write multiple data word of less than maximum length. This leaves more bus cycles for use for other data transfers, which results in a reduction in the number of potential bus conflicts and an overall increase in speed. It will be clear that the reduction of the number of cycles depends on the adjacency of addresses used in write actions. When the addresses are unrelated, no reduction in the number of bus cycles is possible. In this case these publications give no reason for packing words into a larger word.

Apart from causing potential access conflicts that reduce execution speed, address/data busses also cause considerable power consumption. Bus data lines and address lines have to extend over considerable distances because they connect to different units of the circuit. In an integrated circuit the bus lines usually extend over most of the chip size. Thus, bus lines are generally much longer than internal lines in the units of the circuit. The great length of the bus lines means that strong driver circuits are needed, for example to charge the capacitance associated with the bus lines.

Among others it is an object of the invention to reduce the power consumption involved in passing read and/or write data via a data bus.

Among others it is a further object of the invention to reduce power consumption by reducing the number of bus cycles in which new data has to be placed on the data lines of a bus.

Among others it is an object of the invention to increase the useful available bandwidth for passing data over a bus in an electronic circuit.

An electronic circuit according to a first aspect of the invention is set forth in claim 1. According to this aspect data words from different write or read requests are placed together on the data lines of the bus in the same cycle if the size of these data words is smaller than the maximum word size supported by the bus. According to this aspect write addresses associated with write data are placed on the bus in a plurality of different cycles, so that a data receiving circuit or data receiving circuits can use different bus cycles to obtain the different addresses associated with the different data words that have been placed on the bus in parallel.

Typically, one or more of the data handling units that write the data are able to write data words of different sizes. Similarly, memory units may return read data of different sizes. These units are able to signal the size of the words. Dependent on the signaled sizes more or fewer data words are combined in a single cycle. Thus, if one unit produces a word with a size (e.g. 64 bits) that fills the whole data bus, a single address will be output before new data is placed on the data bus. If two data handling units write half size words (e.g. 32 bits each), the two words are placed on the data lines together in a single bus cycle and two bus cycles with addresses for these words are used (one of these bus cycles may coincide with the bus cycle in which the data words were placed on the bus). Similarly, if four data handling units write quarter size words (e.g. 16 bits each), the four words are placed on the data lines together in a single bus cycle and four bus cycles with addresses for these words are used etc.

In an embodiment the addresses are placed on the address lines in a sequence that has a predetermined relation with the position of the corresponding words. Thus, for example the write address for the quarter word at a first position on the data lines is output in one bus cycle, followed in the next bus cycle by the write address for the quarter word at a second position on the data lines etc. In another embodiment a signal line may be provided to signal to which position an address corresponds.

According to another aspect of the invention the bus controller selects the position of a word on the data lines and/or a bus cycle in which a word is output so that the number of logic level changes that is needed to replace the previous data on the data lines with that word is minimized. Thus, power consumption is minimized. In case of four quarter sized words that are placed on the data lines in one bus cycle, for example, twenty four position sequences of words are possible. The bus controller preferably selects the position sequence according to the number of bits that have to change logic level. Preferably, the bus controller selects the position sequence that requires the absolute minimum of changes (i.e. among all twenty four possibilities with four quarter words), but without deviating from the invention the bus controller may select from fewer possibilities, or merely according to a criterion that ensures that the selected position sequence involves less level changes than another possible sequence. Thus, power consumption is reduced although the absolute minimum may not be realized. Similarly, the bus controller may select the temporal sequence in which words are placed on the data lines in successive bus cycles so as to minimize the required number of transitions.

In another embodiment, part of the different bus cycles that are used for supplying the addresses of combined words is used to supply data which requires no address, for example read data or data from a data block for which first a starting address was supplied, so that the data receiving circuit can compute successive addresses internally. This reduces the number of bus cycles that is needed to supply both data and addresses during execution of a given application program and thereby the power supply consumption associated with the program.

In another embodiment, read data words may be packed on the bus with write data words. A read data word is produced in response to a previous read address. Therefore in this embodiment successive addresses do not have to be supplied for all data words that are packed together. This may be used to reduce the number of bus cycles for supplying addresses, for example to be able to place new data on the bus sooner, or to supply other addresses, such as addresses for later read operations.

Figure 1:
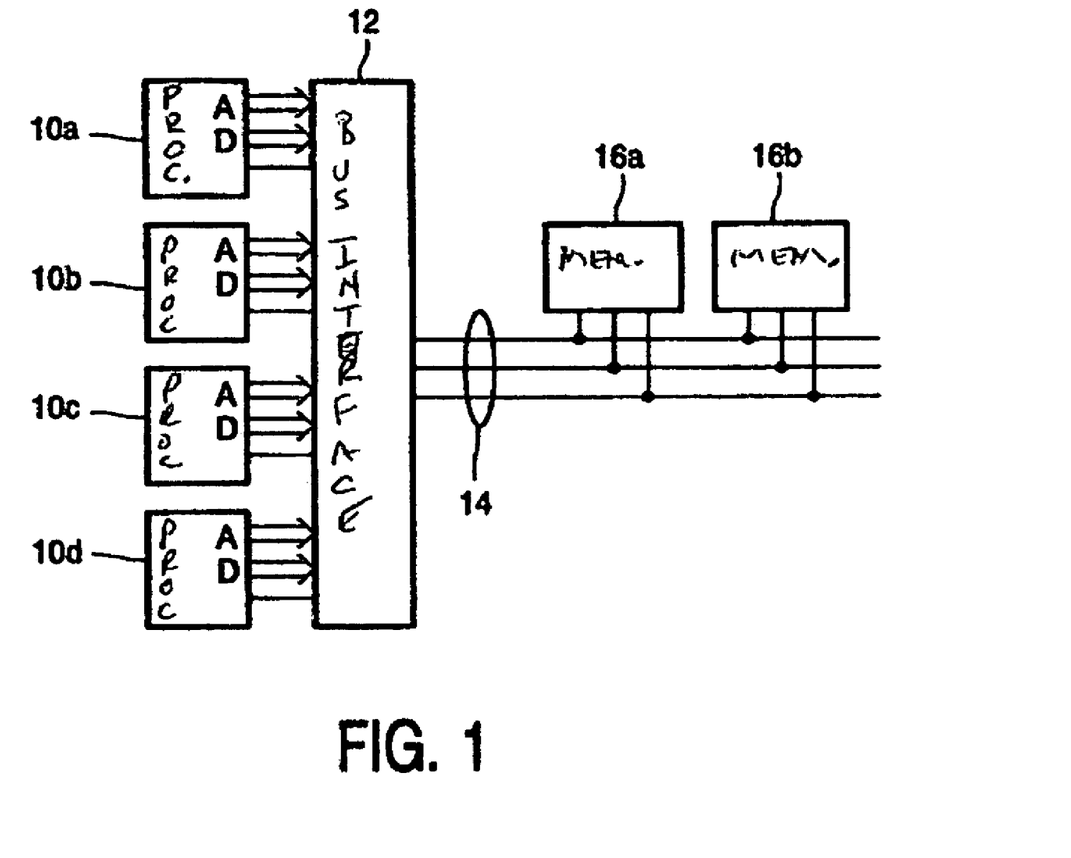
Figure 2:
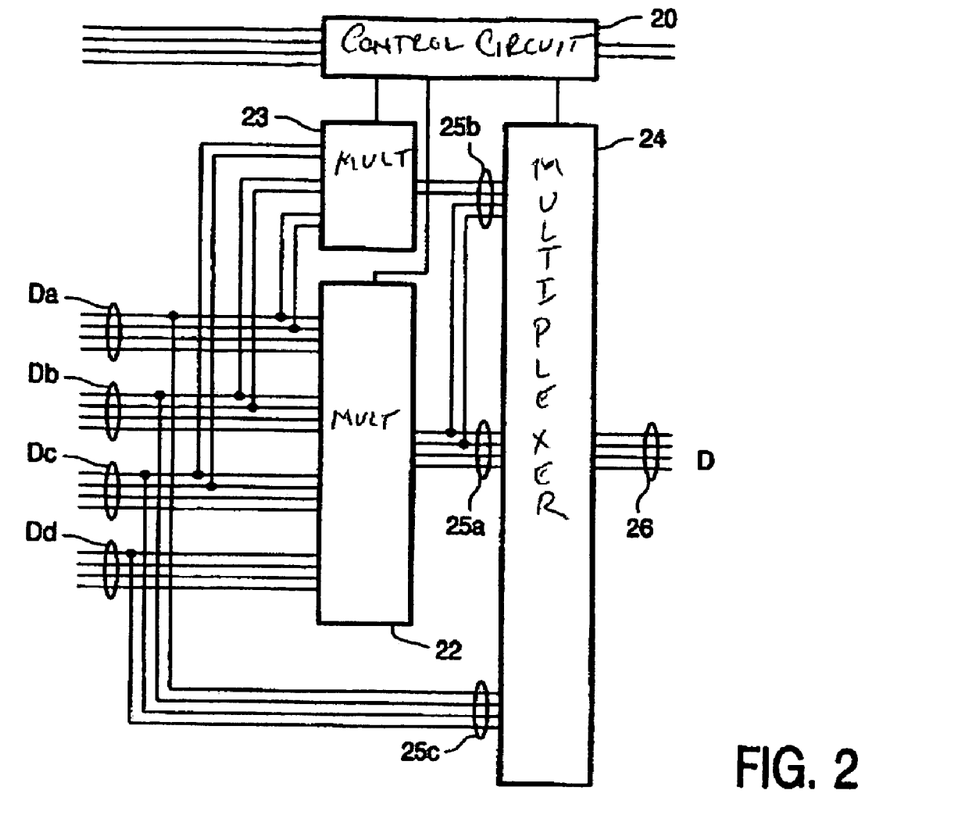
Figure 3:
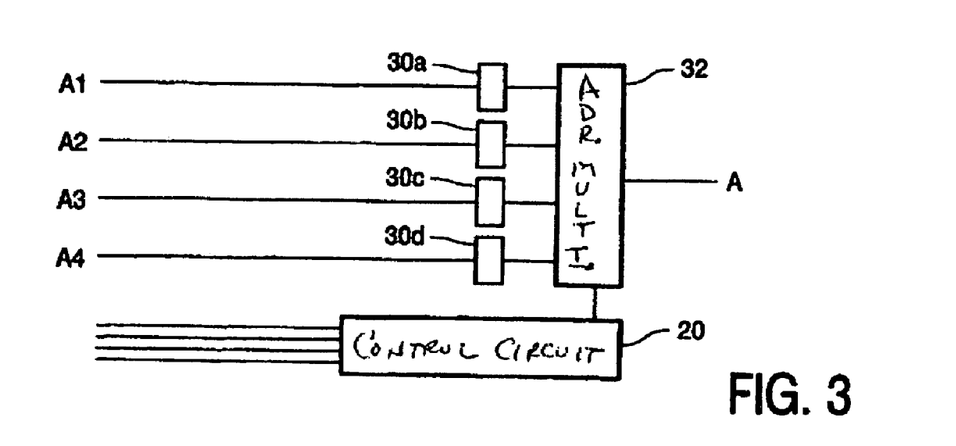
Figure 4:
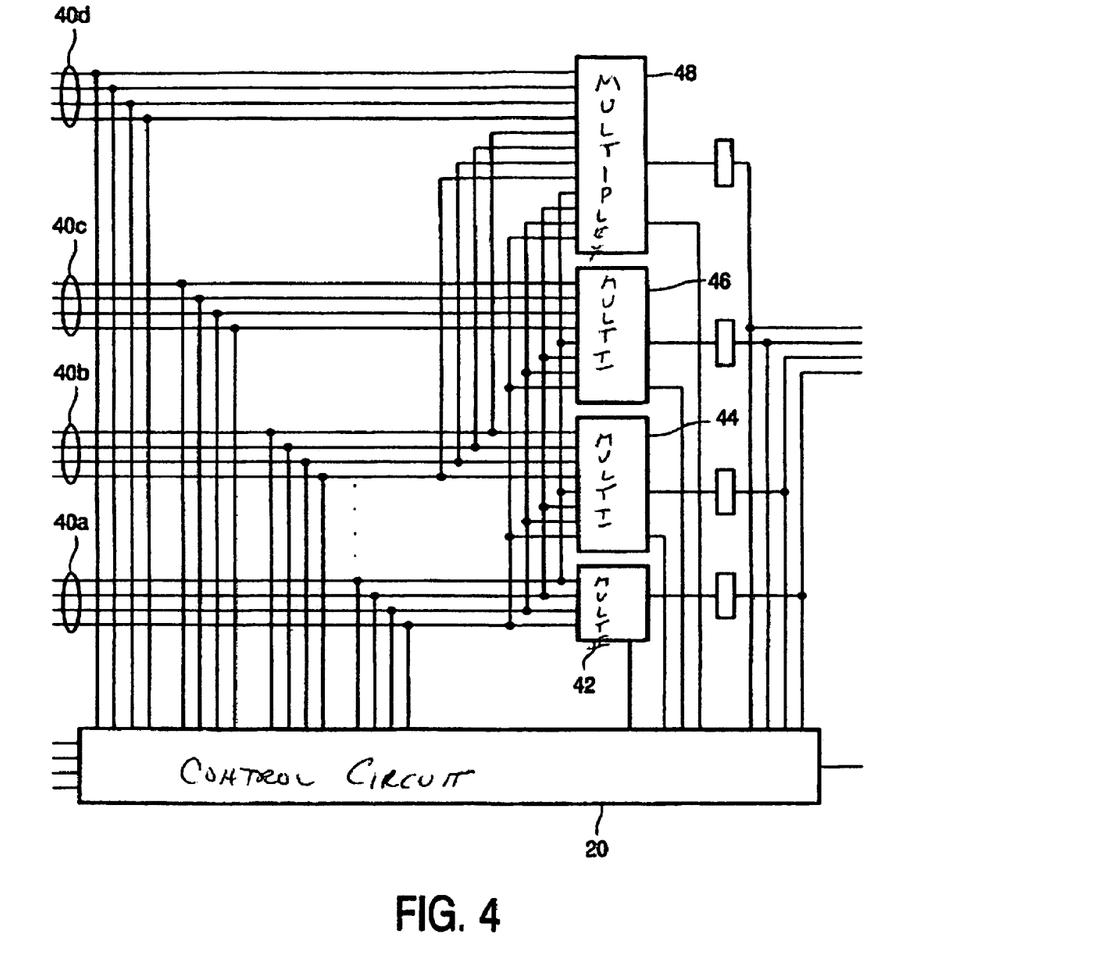
Figure 5A:
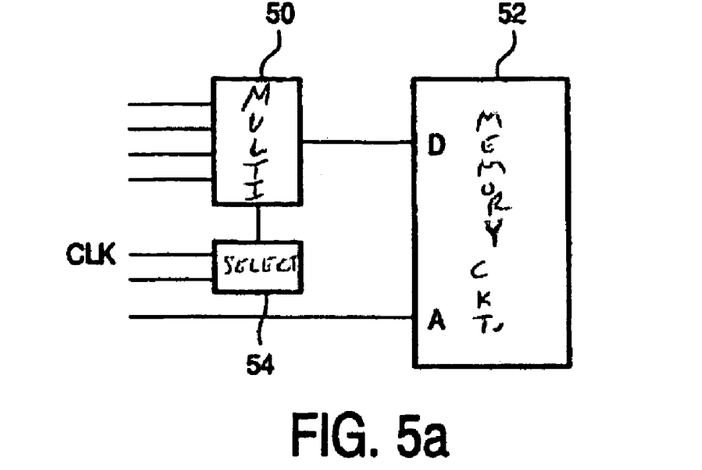
Figure 5B:
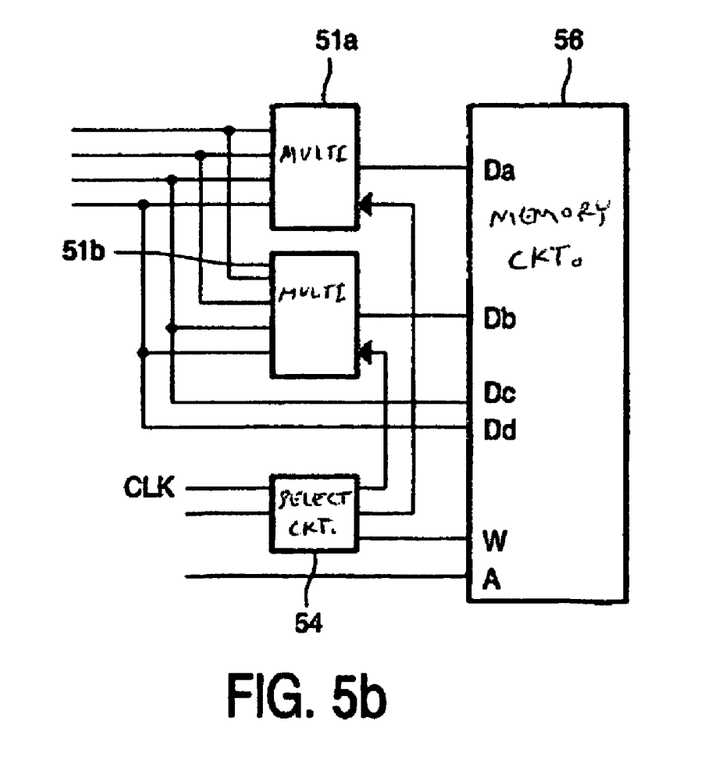
Figure 6:
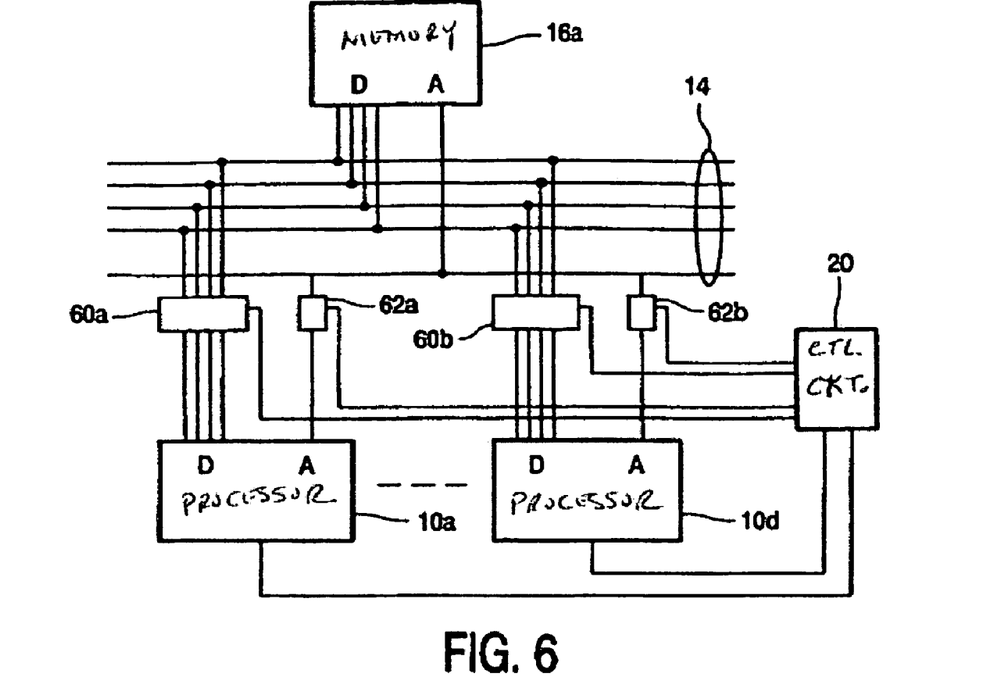
Figure 6A:
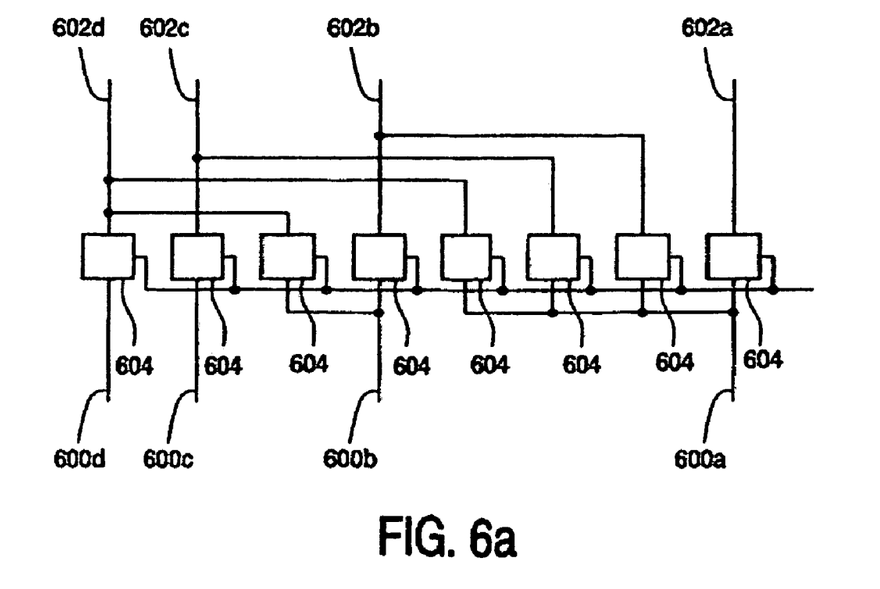
Figure 7:
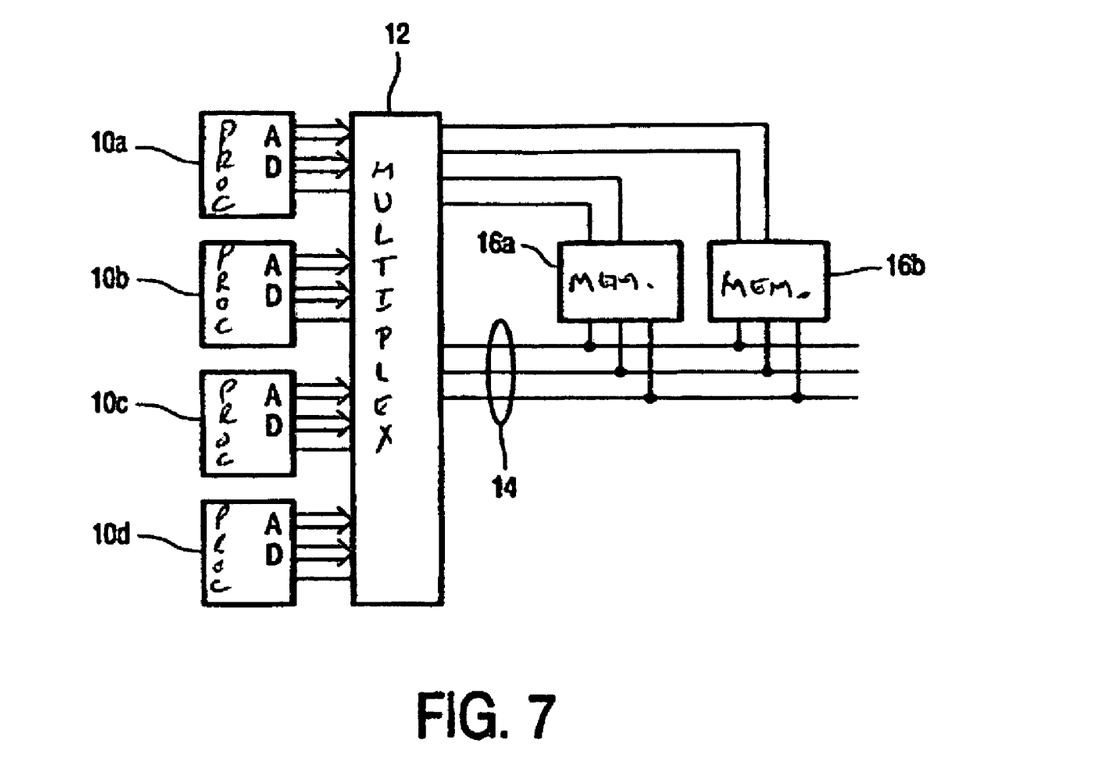

These and other objects and advantageous aspects of the invention will be described in a non-limitative way using the following figures FIG. 1 shows an electronic circuit
FIG. 2 shows a part of a bus interface
FIG. 3 shows a further part of a bus interface
FIG. 4 shows a part of a bus connection
FIG. 5a shows a memory
FIG. 5b shows a further memory
FIG. 6 shows a further electronic circuit
FIG. 6a shows a multiplexer/driver
FIG. 7 shows a further electronic circuit FIG. 1 shows an electronic circuit, containing a plurality of processors 10a-d, a bus interface 12, a bus 14 and a plurality of memories 16a,b. Each processor 10a-d has an address output A, a data output D and a control input/output. Bus interface 12 couples the address and data outputs to bus 14, to which memories 16a,b are coupled to receive address and data information. Bus 14 comprises a plurality of address lines, a plurality of n data lines (e.g. n=64 or n=128 data lines) and control lines.

For the sake of illustration processors 10a-d are shown to have data outputs only, but it should be understood that they may have data inputs, or a data input/output coupled to bus interface 12. Although processors 10a-d are shown, it should be understood that any other kind of data handling circuit may be used. Similarly, although two memories are shown connected to bus 14 for the sake of illustration, it will be understood that many other circuits may be connected to bus 14, not necessarily all memories, or that only a single circuit may be connected to bus 14.

In operation processors 10a-d produce data and write this data to locations in memories 16a,b. For this purpose, processors 10a-d generate write requests as part of which they output addresses and data to bus interface 12. Bus interface 12 operates in bus cycles. In each bus cycle the bus interface passes data bits to the n data lines of bus 14 in parallel. Similarly, the bus interface passes one address in each bus cycle. Memories 16a,b receive the addresses from bus 14 and use them to select locations where the data is written. If necessary, interface 12 arbitrates between conflicting write requests, to sequence data and addresses from different processors 10a-d.

Dependent on the type of data words that have to be written, a greater or lesser number of bits has to be passed from processors 10a-d to bus 14. On a control output processors 10a-d output a code to indicate the number of relevant data bits in the word, e.g. 8 bits, 16 bits, 32 bits or 64 bits. Bus interface 12 tests these codes and, if possible, bus interface 12 packs multiple data words from different ones of processors 10a-d. That is, bus interface outputs data words from different processors 10a-d in parallel on the n data lines of bus 14 in the same bus cycle. For example, two n/2 long data words may be output in parallel, or four n/4 long words. The corresponding addresses of the different words are output in successive bus cycles. This is illustrated in table I.

TABLE I example of bus occupation

| Bus Cycle No | Address | Data |
| --- | --- | --- |
| 1 | A1 | Da1 Da2 Dd1 Dd2 |
| 2 | A4 | |
| 3 | A1' | Da1' Db1' Dc1' Dd1' |
| 4 | A2' | |
| 5 | A3' | |
| 6 | A4' | |
| 7 | A2" | Db1" Db2" Db3" Db4" |
| 8 | | |

Table I shows a number of successive bus cycles (numbered 1-8), the addresses output on bus 14 for these cycles and the data output on the data lines of bus 14 in these cycles. The data output from a first processor 10a for use in one bus cycle is assumed to be composed of four parts labeled Da1, Da2, Da3, Da4 (each part e.g. 16 bits long). Similarly the output data from the second, third and fourth processor 10b-d for use in one bus cycle are assumed to be composed of four parts each, labeled Db1, Db2, Db3, Db4 and Dc1, Dc2, Dc3, Dc4 and Dd1, Dd2, Dd3, Dd4 respectively.

It is assumed that initially the first and fourth processor 10a,d indicate that they output half size data words (n/2 bits), next four processors 10a-d indicate that they output quarter sized data words (n/4 bits) and next second processor 10b indicates that it outputs a full sized data word (n bits).

In the bus cycle numbered 1 bus interface 12 places the data bits from the two half size data words from the first and fourth processors 10a,d on the n data lines of bus 14 in parallel. This is indicated by the parts Da1, Da2, Dd1 and Dd2 in the entry for bus cycle number 1. Bus interface outputs the addresses A1 and A4 for these data words from the first and fourth processor 10a, 10d in successive bus cycles 1, 2. (Although it is shown that one address is output in the same bus cycle as the data it will be understood that, due to pipe-lining, other relations between address and data timing may pertain).

In the bus cycle numbered 3 bus interface 12 place the data bits from the four quarter size data words from the processors 10a-d on the n data lines of bus 14 in parallel. This is indicated by the parts Da1', Db1', Dc1' and Dd1' in the entry for bus cycle number 3. Bus interface outputs the addresses A1', A2', A3' and A4' for these data words from the processors 10a-d in successive bus cycles 3-6.

In the bus cycle numbered 7 bus interface 12 place the data bits from the data word from second processors 10b on the n data lines of bus 14 in parallel. This is indicated by the parts Db1", Db2", Db3" and Db4" in the entry for bus cycle number 7. Bus interface outputs the address A2" for this data word from second processor 10b in bus cycle 7.

Although full occupation of the data lines has been shown for each bus cycle in which new data was placed on the bus, it will be understood that, if processors 10a-d output insufficient data, the n data lines need not all be used: e.g. three n/4 bit data words may be placed on the data lines of bus 14 in parallel or just one or two. Similarly, although all data words were shown to be of the same size, it will be understood that in fact also data words of mutually different size may be placed on the data lines of bus 14 in parallel in the same bus cycle: one half size (n/2 bit) data word and two quarter size (n/4 bit) data words for example or one half size (n/2 bit) data word and one quarter size (n/4 bit) data word.

In an embodiment the apparatus supplies read data in a bus cycle wherein a write address but no write data is supplied. As described, less than full size write data words for different addresses are placed on the data lines of bus 14 concurrently in one bus cycle, and the addresses for these combined data words are placed on the address lines sequentially in a plurality of bus cycles. Thus the data lines of the bus are occupied in a bus cycle that is in a specific relation to the bus cycle in which one of the addresses is supplied, but the data lines of the bus are free in at least one bus cycle that is in the same specific relation to the other bus cycle or cycles in which addresses are supplied. In this embodiment read data (supplied in response to an earlier read address) is supplied via the data line in this other bus cycle or these other bus cycles. This is illustrate in table Ia TABLE Ia reuse of bus cycles for read data

| Bus Cycle No | Address | Data |
| --- | --- | --- |
| 1 | A1 | Da1 Da2 Dd1 Dd2 |
| 2 | A4 | |
| 3 | A1' | Da1' Db1' Dc1' Dd1' |
| 4 | A2' | R1 |
| 5 | A3' | |
| 6 | A4' | R2 |
| 7 | A2'' | Db1'' Db2'' Db3'' Db4'' |
| 8 | | |

In this example the bus cycles numbered 4 and 6 are used to supply read data words R1 and R2 on the data lines of the bus.

FIG. 2 shows an example of a data part of bus interface 12 that may be used to place data words from different processors 10a-d on the data lines of bus 14 in parallel. The interface contains a control circuit 20 and a first, second and third multiplexer 22, 23, 24. Multiplexers 22, 23, 24 are controlled by control circuit 20, which receives control signals from processors 10a-d and outputs a control signal on bus 14. First multiplexer has inputs coupled to four groups of data lines Da, Db, Dc, Dd from processors 10a-d respectively. Each group of data lines contains four sub-groups (each shown as a single line, although it should be understood that each sub-group contains a plurality of lines in parallel (e.g. 8 or 16 lines). The lines from the first two subgroups of each of three of the groups Da, Db, Dc are coupled to second multiplexer 23. Third multiplexer 24 has first inputs coupled to a group of data lines 25a output by first multiplexer 22, second input coupled to a second group of data lines 25b, which includes two sub groups output by second multiplexer 23 and two of the sub-groups from the first input 25a. Furthermore third multiplexer 24 has a third input coupled to third group of data lines that are coupled to the first subgroups of each of the four groups of input data lines Da, Db, Dc, Dd. Third multiplexer 24 has a group of output lines 26 that are coupled to the data lines of data bus 14.

In operation first multiplexer 22 couples the group of data bitlines Da, Db, Dc, Dd from a selected one of processors 10a-d to its output at bit lines 25a. Second multiplexer 23 couples two sub-groups of data bit lines from a selected one of three of the processors 10a-c to two of the sub-groups of second input 25b of third multiplexer 24. Third multiplexer 24 coupled the data bit lines from a selected one of its inputs 25a-c to its outputs 26. Control circuit 20 controls selection by multiplexers 22, 23, 24 dependent on control signals from processors 10a-d.

When the control signals from processors 10a-d indicate that a full size (n-bit) data word is supplied on one of the groups of data lines Da, Db, Dc, Dd of processors 10a-d, control circuit 20 signals first multiplexer to pass the signals from that group of data lines to output lines 25a. In this case control circuit 20 signals third multiplexer 24 to pass the signals from the output 25a of first multiplexer 22 to output lines 26.

When the control signals from processors 10a-d indicate that four quarter sized (n/4 bits) data words are supplied by each of the groups of data lines Da, Db, Dc, Dd of processors 10a-d, control circuit 20 signals third multiplexer 24 to pass the signals from the third input 25c, which is coupled to sub-groups that contain one quarter word of each group of data lines Da, Db, Dc, Dd from all processors.

When the control signals from processors 10a-d indicate that two half size (n/2-bit) data words are supplied on two of the groups of data lines Da, Db, Dc, Dd of processors 10a-d, control circuit 20 signals first multiplexer to pass the signals from one of those groups (from fourth group 10d if that is one of the two groups). Furthermore control circuit 20 signals second multiplexer 23 to pass signals from the sub-groups of data lines that contain the other half word. In this case control circuit 20 signals third multiplexer 24 to pass the signals from its second input 25b that combines the half sized words from the outputs of first and second multiplexer 22, 23.

FIG. 3 shows the part of bus interface 12 that passes addresses from processors 10a-d. The interface contains registers 30a-d for storing the addresses output by processors 10a-d and an address multiplexer 32 to pass selected ones of the addresses from registers 10a-d to the address lines of data bus 14. When the control signals from processors 10a-d indicate that a full size (n-bit) data word is supplied on one of the groups of data lines Da, Db, Dc, Dd of processors 10a-d, control circuit 20 signals address multiplexer to pass the address A1, A2, A3, A4 from that processor 10a-d. When the control signals from processors 10a-d indicate that two half size (n/2-bit) data words are supplied on two of the groups of data lines Da, Db, Dc, Dd of processors 10a-d, control circuit 20 signals address multiplexer to pass two addresses from A1, A2, A3, A4 from those processors 10a-d successively, in successive bus cycles. When the control signals from processors 10a-d indicate that four quarter size (n/4-bit) data words are supplied on four of the groups of data lines Da, Db, Dc, Dd of processors 10a-d, control circuit 20 signals address multiplexer to pass four addresses A1, A2, A3, A4 from those processors 10a-d successively, in successive bus cycles.

Control circuit 20 outputs a code to bus 14 to signal to memories 16a,b which form of packing is used.

In response to data from the bus the memories unpack the data from bus 14 according to this code. Preferably, the sequence wherein the addresses are passed corresponds to positions at which the corresponding data words are placed on the data lines, so that memories automatically know for which data which address is applicable. In a further embodiment control circuit outputs signals to bus 14 to indicate in each bus cycle for which part of the data lines the address in that bus cycle is applicable.

In the embodiments described thus far no special selection was made as to from which processor 10a-d a data word was passed to which of the data lines of data bus 14. According to one aspect of the invention control circuit 20 makes a selection to determine from which processor the data word is passed to which of the data lines. Control circuit guides this selection so as to minimize the number of data lines of bus 14 that will have to undergo a logic level change. This saves energy, since the data lines of bus 14 are generally very long, so that it requires a considerable amount of energy to realize a logic level change. Table II illustrates possible placements of two half size (n/2 bit words) W1, W2

TABLE II

| first bit lines | second bit lines |
| --- | --- |
| W1 | W2 |
| W2 | W1 |

If in a previous bus cycle the first bit lines carried bits V1 and in the second bit lines carried bits V2, the number of logic level changes for the first placement is $h(W1,V1)+h(W2,V2)$ (the function "h" denoting the Hamming distance) and for the second placement $h(W2,V1)+h(W1,V2)$ Control circuit 20 determines which placement yields least logic level changes, controls the data connections so that the words W1, W2 are placed according to the placement with a minimum number of changes. The addresses of the words W1, W2 are supplied accordingly.

As will be appreciated the selection of the position of the data words involves a determination of a "better" placement of words, which involves less logic level changes on the data lines of bus 14. Such a determination can be performed in various ways.

Ideally, the best possible placement is selected, but a gain is already realized if the selection is such that averaged over many different bus cycles the number of logic level changes is reduced. The best possible placement can be selected for example by generating all possible placements successively internally in the bus interface, determining the hamming distance between each of the placements and the data currently on the bus, reverting to the placement that has least distance and only then outputting that placement to the bus. In case of two half words two (2!) placements are possible; in case of four quarter words twenty four (4!) placements are possible.

It may be noted that it is not necessary to test all possible placements to find the placement that involves least logic level changes. For example, if a first and second placement, which differ only by the exchange of two particular data words, have been compared with the data on the data lines of bus 14, and it has been found that the first placement is better than the second placement, then there is no further need to consider further placements that have the particular data words in the same location as second placement.

If the bus interface is not capable of generating all possible placements (as in the case of the interface of FIG. 2) all placements may be tried that the interface can produce. Thus, although the placement that will-be-found is possibly not the best possible placement, the placements that are found will on average involve fewer logic level changes than any fixed selection of placement that is permitted by the interface.

FIG. 4 shows a part of a data interface wherein control circuit 20 is arranged to select a placement so as to reduce the number of logic level changes. In this embodiment inputs 40a-d supply information from the processors (not shown). Control circuit 20 receives the information, and uses it to compute the location at the output bus 14 where information from respective processors should be output. Subsequently, control circuit 20 controls multiplexers 42, 44, 46, 48 to output the data according to the computed locations. Subsequently control circuit 20 outputs the addresses of the data from the different processors successively. Thus it is not necessary to use multiplexers 42, 44,46, 48 in a search for an optimal placement. The data from the multiplexers 42, 44, 46, 48 may be stored in registers before passing to the bus, so that control circuit 20 can select a next placement while the previous data is output to the bus.

Control circuit 20 may compute the optimal placement for example by sequentially computing the number of level changes involved in a number of possible placement and selecting an optimal one. As an alternative to sequential comparison of all possible placements the circuit may also use a parallel form of comparison. This comparison, too, can be such that it is ensured that the best possible placement will be found, or only partial in the sense that the placements that are found tend to be better than others.

As a separate aspect, in the embodiment of FIG. 4 respective inputs 40a-d are organized so that each of the processors (not shown) supplies information to all inputs, groups of bits of different significance level being supplied to different inputs. That is inputs 40a-d are not organized so that each processor (not shown) supplies information to a respective one of the inputs 40a-d. At a first input 40a each of the processors supplies the smallest sub-words (e.g. 8 or 16 bits wide, each single line denoting lines for 8 or 16 bits in this case) of the information from that may be placed on the bus. A second input 40b each of the processors may supply the additional bits contained in the next larger sub-word (e.g. the next 8 bits that form a 16 bit sub-word with the information from first input 40a, or the next 16 bits that form a 32 bit sub-word with the information from first input 40a). At third and fourth inputs 40c,d the processors may supply further parts of the words.

Control circuit 20 controls multiplexers 42, 44, 46, 48 dependent on the required word size. If a full word size is required control circuit causes each multiplexer 42, 44, 46, 48 to pass data from the same processor, from respective inputs 40a-d. If two words of half word size are required, control circuit 20 causes a first and second multiplexer 42, 44 to pass data from first and second input 40a,b, both from a first selected processor, and control circuit 20 causes a third and fourth multiplexer 46, 48 to pass data from the first and second input 40a,b both from a second selected processor. If four words of quarter size are required, control circuit 20 causes each multiplexer 42, 44, 46, 48 to pass data from a respective one of the inputs 40a-d from respective selected processors.

It will be appreciated that the embodiments shown in the figures merely serve as examples and do not limit the scope of the invention. Many alternative embodiments are possible. For example, one or more of the processors may be replaced by other types of data handling units, such as I/O interfaces, dedicated processing hardware (e.g. signal encoding or decoding hardware etc.) or memories. Although the memories 16a,b are shown coupled to the bus only as data receiving units, it will be understood that memories 16a,b may also be connected for writing data to the bus. In this case they may be coupled as shown for processors 10a-d.

Similarly, the invention is of course not limited to the use of four data handling units, nor does the number of data handling units necessarily coincide with the maximum number of sub-words that can be placed on the data bus in parallel. A greater number of data handling units may be present, in which case control circuit 20 may arbitrate access to the bus so that no data is placed on the bus from one or more of the processors, even when sub-words from a maximum number of processors is placed on the bus in parallel.

In a further embodiment, control circuit may be adapted to arbitrate which of the data handling units get access to the bus dependent on the word size with which these data handling units supply data. E.g. if four data handling units supply quarter words and two supply half words, then control circuit preferably grants access to the four data handling units with quarter words together or to the two data handling units with half words together in. order to promote packing. That is, during arbitration control circuit 20 preferably selects a word size, from the word sizes of data handling units that want to supply words to the data bus and grants access to the data handling units that supply words of the selected size., In another embodiment, the circuit is arranged to combine words of different sizes on the data lines of the bus, e.g. two words of 16 bits and one word of 32 bits. It will be appreciated that this requires a more complicated multiplexing structure. However, in this case there is no need to select a word size as part of arbitration between different data handling units.

Although preferably each data handling unit (e.g. processor 10*a-d*, or memory) coupled to the bus has the capability of outputting data words of different sizes, it will be understood that without deviating from the invention part or all of the data handling units may be able to output only data words of their own particular predetermined size, or of a predetermined subset of the sizes that can be handled by bus 14.

When all data handling units are capable of outputting only data words of their own particular predetermined size, control circuit 20 selects packing according to the subset of data handling units that output data together (or more particularly according to the specific word sizes of those data handling units). For example, if four data handling units that output 16 bit words are active together control circuit 20 may select packing of four 16 bit words, and if two other data handling units output 32 bit words control circuit 20 may select packing of two 32 bit words. Similarly, not all memories 16*a,b* need to be able to handle all word sizes. In some embodiments words of different sizes may be written to different memories only, or some memories may accept words of multiple sizes whereas others accept words of only one size, only words of the latter size being to those memories.

FIG. 5*a* shows an example of an embodiment of memory 16*a,b* that is capable of handling only one word size. The memory contains a multiplexer 50, a memory circuit 52 and a word selection circuit 54. The data lines from the bus are coupled to the inputs of multiplexer 50 (four lines shown, each representing for example 8 or 16 data lines). An output of multiplexer 50 is coupled to a data input of memory circuit 52. The address lines from the bus are coupled directly (without multiplexing) to an address input of memory circuit 52. Word selection circuit 54 controls multiplexer 50.

In operation word selection circuit 54 receives a signal indicating that four. successive addresses will be supplied for data that is supplied in parallel on the data lines. In this case, word selection circuit 54 causes multiplexer 50 to pass different sub-words:from the data lines to the data input successively, so that these sub-words are written into memory circuit 52 under influence of successively supplied addresses. A predetermined sequence of sub-word selections may be used for example, through which selection circuit 54 cycles under influence of a bus clock. But in a different embodiment selection signals may be supplied from the circuit that packs the words.

FIG. 5*b* shows an example of an embodiment of memory 16*a,b* that is capable of handling more than one word size. In this embodiment a memory circuit 56 is used that has four (e.g. 8 or 16 bit) groups of data inputs Da, Db, Dc, Dd, the first group Da serving for receiving quarter word data, the first and second group Da, Db together serving 30 for receiving half word data and all groups Da, Db, Dc, Dd serving to receive full word data A width selection input W of memory circuit 56 is used to select whether quarter, half or full words will be written.

Two multiplexers 51 *a,b* are provided between the data lines of the bus and the first and second groups D*a*, and D*b* respectively. Word selection circuit 54 controls multiplexers 51*a,b*. Two groups of data lines from the bus (single lines shown to symbolize the groups) are coupled to the third and fourth inputs Dc, Dd respectively.

In operation word selection circuit 54 receives an indication whether quarter, half or full words are supplied on the bus and signals this to memory circuit 56 accordingly. In case of quarter words memory circuit 56 reads only from its first group of inputs Da and word selection circuit 54 controls the multiplexer 51*a* coupled to this group of inputs to pass data from different groups of data lines of the bus successively. In case of half words memory circuit 56 reads only from its first and second group of inputs Da, Db and word selection circuit 54 controls the multiplexers 51*a*, 51*b* coupled to these group of inputs to pass data from different pairs of groups of data lines of the bus successively (e.g. first from two predetermined groups and subsequently from the remaining groups). In case of full words memory circuit 56 reads all its group of inputs Da, Db, Dc, Dd and word selection circuit 54 controls the multiplexers 51*a*, 51*b* to pass data from different pairs of groups of data lines of the bus to respective ones of the groups of inputs.

It will be understood that, instead of memories, other data receiving circuits may be coupled to the bus to receive the packed data. It will be understood that the data receiving circuit may have a register (not shown) coupled between the bus and multiplexer 50 or 51*a,b*. In this case bus interface 12 may be arranged to drive the data lines of the bus only until the packed data has been stored in the register, while using a plurality of addresses to supply addresses for the data that is supplied in that cycle. Thus, power consumption for driving the bus is reduced.

It will be understood that interface 12 may also be realized by means of respective multiplexer/bus drivers associated with respective ones of the data handling units.

FIG. 6 shows an embodiment in which data handling units 10*a,d* (only two shown, an arbitrary number similarly connected units may be present) have data outputs coupled to data lines of bus 14 via multiplexer/bus drivers 60*a,b* and address outputs coupled tto address lines of bus 14 via address drivers 62*a,b* (single bus lines are shown to symbolize groups of conductors, e.g. groups of 8 or 16 data conductors and a group of 32 address conductors). Data handling units 10*a, d* have control connections coupled to control circuit 20. Control circuit 20 has control connections coupled to multiplexer/bus drivers 60*a,b* and address drivers 62*a,b* of the various data handling units 10*a, d*.

FIG. 6*a* shows an example of an embodiment of a multiplexer/bus driver. In this figure, groups of data lines 600*a-d* from the data handling units (not shown) are shown as single lines. Similarly groups of data lines 602*a-d* coupled to the bus (not shown) are shown as single lines. The multiplexer/bus driver contains four groups of tri state drivers 604 (the output states being logic high, logic low and high impedance) coupling a first group of data lines 600*a* from a data handling unit to a first, second, third and fourth group of data lines 602*a-d* from the bus respectively. The multiplexer/bus driver contains two groups of tri state drivers 604 coupling a second group of data lines 600*b* from a data handling unit to the second and fourth group of data lines 602*b, d* from the bus respectively. The multiplexer/bus driver contains two groups of tri state drivers 604 coupling a third and fourth group of data lines 600*c, d* from a data handling unit to the third and fourth group of data lines 602*c, d* from the bus respectively. The control circuit controls which, if any, of the groups of tri state drivers 604 are active, so that a quarter data word from the first group of data lines 600*a* from the data handling unit can be passed to any selected one of the groups of data lines 602*a-d* from the bus, a half data word from the first and second group of data lines 600*a,b* from the data handling unit can be passed to the first and second groups of data lines 602*a,b* from the bus or to the third and fourth groups of data lines 602*a,b* from the bus and a full size data word from all of the groups of data lines 600*a-d* from the data handling units can be passed to respective groups of data lines 602*a-d* from the bus.

In operation control circuit 20 receives access requests from data handling units 10*a, d* to writing write data and accompanying addresses onto bus 14. Control circuit 20 selects a data handling unit to put a single data word on bus 14 or a combination of data handling units to put a combination of less than full size data words on bus 14. Control circuit 20 signals to multiplexer/bus drivers 60*a,b* which of multiplexer/ bus drivers 60*a,b* should drive data from the associated data handling unit 10*a, d* to data lines of bus 14, and, in case of a word of less than full size, to which of the groups of data lines of the bus. In case of a combination of data, control circuit 20 signals multiplexer/bus drivers 60*a,b* to do so concurrently for respective different groups of data lines of bus 14, so that words of less than full size from different processors are combined on bus 14 in this case.

Control circuit 20 also signals address drivers 62*a,b* to drive address information from associated data handling units 10*a, d* to address lines of bus 14. Control circuit signals multiplexer/bus drivers 60*a,b* to do so sequentially with address information for data words that are put on the bus together.

In this embodiment the selection of positions of words on the data bus is not optimized to minimize the number of level changes. If optimization is desired, data from at least part of data handling units 10*a, d* and data from the bus lines are also supplied to control circuit, and the control circuit is arranged to select positions in a combined placement of data to reduce the number of level changes. Control circuit 20 then effects the selected combination by supplying corresponding control signals to multiplexer/bus drivers 60*a, b*.

Moreover, memory 16*a* may be coupled to control circuit 20 to request access to the data lines of bus in order to return read data. Control circuit 20 preferably grants memory 16*a* access to the data lines for this purpose in bus cycles in which the data lines remain free from write data because the corresponding address applies to a less than full size data word that was supplied together with other less than full size data words.

In one embodiment, read requests from data handling units 10*a,b* to memory 16*a* are each accompanied on bus 14 by an identification of the data handling unit 10*a,b* or the read request, and memory 16*a* returns the identification with the read data on bus 14, the requesting data handling unit being arranged to compare the identification with the identification from its own read requests and to capture the read data if the identification matches. Alternatively control circuit 20 maintains a queue of identifications of data handling units 10*a,b* that issued as yet unanswered read requests, and, upon allowing read data to be placed on the bus, signals to the data handling unit 10*a,b* that issued the oldest unanswered read request for the memory unit from which read data is supplied, that this data handling unit should read the read data from bus 14.

Although the invention has so far been described for packing write data, i.e. data that is supplied in a write request in conjunction with an address, the invention can also be applied to read data (supplies in response to an address in a read request) and/or to combinations of read data and write data. Of course, read data words of less than full bus size can be packed with write data and/or other read data just as any data The difference is that the read address has to be supplied to the bus in advance and need not be supplied with the read data.

FIG. 7 shows a further embodiment in which memories 16*a,b* have control and data outputs coupled to interface 12 to indicate the availability of read data. Interface 12 may have any of the structures disclosed in the preceding, except that the control outputs of memories 16*a,b* are coupled to control circuit 20 (not shown separately) and the data outputs of memories 16*a,b* are coupled to inputs of the multiplexers (not shown separately). In interface 12 the outputs of the memory are couple to the control circuit (not shown separately) which selects a combination of words of less than full size that will be placed on the bus. Subsequently, the control circuit causes the selected placement to be effected on the data lines of the bus. As far as write data is involved, the control circuit causes the associated address to be placed on the address lines of the bus sequentially, for example in a sequence according to the order in which the corresponding data is placed on the data lines. In time slots that correspond to read data no address need be placed on the bus, but of course the address lines may be used for issuing another read request.

Table III shows an example in which words of write data WD and words of read data RD are placed on bus 14. As can be observed in bus cycle 3, two quarter words of write data WDa1', WDc1' and two quarter words of read data RDb1', RDd1' are placed on the data lines of bus 14 together. In bus cycles 3 and 5 the addresses for the write data are supplied.

TABLE III further example of bus occupation

| Bus Cycle No | Address | Data |
| --- | --- | --- |
| 1 | A1 | WDa1 WDa2 WDd1 WDd2 |
| 2 | A4 | |
| 3 | A1' | WDa1' RDb1' WDc1' RDd1' |
| 4 | X | |
| 5 | A3' | |
| 6 | X | |
| 7 | A2" | WDb1" WDb2" WDb3" WDb4" |
| 8 | | |

It may be noted that no read addresses need be supplied for the read data (indicated by X in the bus cycles numbered 4 and 6), since the read address is supplied in advance, before reading the data. The control circuit may be arranged to indicate to the data handling units for which of the data handling unit the read data word is intended, for example on the basis of information about an oldest read request from a queue of as yet unanswered read requests form respective memories, in which queue the data handling unit that has issued the request is recorded.

In an embodiment the bus cycles without address may be used to supply read addresses for new read requests. In another embodiment these bus cycles are omitted, e.g. in table III bus cycles 4 and 6 would be omitted so that there is only one intermediate bus cycle between cycles 3 and 6 in which the data words are placed on the bus. In this embodiment the control circuit 20 is preferably arranged to provide a signal to memories 16a,b for each address, to indicate to which of the less than full size data words in a packed data word the address applies. In the case that read results are included in the packed data word, the control circuit 20 optionally is arranged to provide a signal to processors 10a-d to indicate which of the less than full size data words in a packed word are the result of read requests, so that the processors are enabled to select the read results, but alternatively, of course the circuit may be provided with multiplexers that enable control circuit 20 to ensure that the read results from the packed words are fed to those processors that issued the read requests that resulted in the read results.

It should be noted that the above-mentioned embodiments illustrate rather than limit the invention, and that those skilled in the art will be able to design many alternative embodiments without departing from the scope of the appended claims. In the claims, any reference sign placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An electronic data processing circuit, the circuit comprising
   a plurality of data handling units with data outputs, at least part of the data handling units having address outputs;
   a bus with address lines and data lines, the data lines supporting simultaneous transfer of up to a maximum number of bits in a bus cycle;
   a bus controller coupled to the data handling units and arranged to control access to the bus in successive access cycles, the bus controller being arranged to cause data bits from a plurality of data words of less than said maximum number of bits, from respective ones of the data handling units, to be placed in combination on the data lines in a same bus cycle, the bus controller causing write addresses that the respective ones of the data handling units supply for respective ones of the plurality of data words to be placed on the address lines in a plurality of respective bus cycles, corresponding to a position said data word is placed on the data lines.

2. An electronic data processing circuit according to claim 1, wherein the data handling units support a variable word size, the bus controller adapting a number of words in the plurality of data words that is placed on the data lines to the word size or word sizes supplied by the data handling units.

3. An electronic data processing circuit according to claim 1, wherein the bus controller is arranged to select a distribution of which bits of the plurality of words will be placed on which of the data lines in said same cycle, dependent on an evaluation that takes account of a number of data lines that will change logic level upon placing the bits of the plurality of words on the data lines, the bus controller selecting a distribution that minimizes the number of data lines that will change logic level among at least two possible distributions.

4. An electronic data processing circuit according to claim 3, wherein the bus controller selects the distributions from permutations of placements of the plurality of words on the data lines.

5. An electronic data processing circuit according to claim 4, wherein the bus controller causes the addresses that the respective ones of the data handling units supply for respective ones of the plurality of data words to be placed on the address lines in successive bus cycles.

6. An electronic data processing circuit according to claim 1, wherein at least one of the data handling units is a memory unit, the bus controller being arranged to include, among said plurality of data words that is placed in combination on the data lines in a same bus cycle, a read result produced by said memory unit when available.

7. An electronic data processing circuit according to claim 6, wherein the control circuit is arranged to adjust a number of bus cycles in the plurality of respective bus cycles in which addresses are placed on the address lines for respective ones of the plurality of data words, said number being adjusted dependent on a further number of read results that is included in the plurality of data words.

8. An electronic data processing circuit according to claim 1, comprising a data receiving circuit coupled to the bus, the data receiving circuit being arranged to handle multi bus cycle data transfers via the bus using a single start address supplied via the address lines, the bus controller being arranged to place the addresses that the respective ones of the data handling units supply for respective ones of the plurality of data words on the address lines in bus cycles corresponding to a multi bus cycle data transfer wherein the multi bus cycle data transfer involves no address transfer.

9. An electronic data processing circuit, the circuit comprising
   a plurality of data handling units with data outputs, at least part of the data handling units having and address outputs for writing words of data;
   a bus with address lines and data lines;
   a bus controller coupled to the data handling units and arranged to control access to the bus in successive access cycles, the bus controller being arranged to select a distribution and placement of said data words from the data handling units on the data lines of the bus, dependent on an evaluation that takes account of a number of data lines that will change logic level upon placing the words on the data lines, the bus controller selecting a distribution that minimizes the number of data lines that will change logic level among at least two possible distributions.

10. An electronic data processing circuit according to claim 9, wherein the bus controller is arranged to select the distribution of a plurality of words that are placed on the data lines in parallel.

11. An electronic data processing circuit according to claim 9, wherein the bus controller is arranged to select a sequence of a plurality of words that are placed on the data lines or a subset of the data lines in series.

12. A method of processing data, the method comprising
   supplying a plurality of data words with variable word size and addresses for those data words;
   placing data bits from the plurality of data words of less than the maximum word size on data lines of a bus in a same bus cycle if more than one of the plurality of data words has a word size of less than the maximum word size;
   placing the addresses for respective ones of the plurality of data words on address lines of the bus in a plurality of respective bus cycles.

13. A method of processing data, the method comprising supplying respective data words for output on data lines of a bus;

selecting distribution of the data words over the data lines and/or over a temporal sequence in which the data words will be placed on the bus, taking account of a number of data lines whose logic level will change upon placing the data words on the data lines, the distribution being selected to minimize the number of data lines that will change logic level among at least two possible distributions;

placing the data words on the data lines of the bus according to the selected distribution.

* * * * *